United States Patent
Uhl et al.

(10) Patent No.: US 9,364,857 B1
(45) Date of Patent: Jun. 14, 2016

(54) PEEL AND PAINT TEMPORARY PROTECTIVE COMPOSITION SURFACE COATING

(75) Inventors: David Uhl, Aledo, TX (US); Olaf Lammerschop, Danville, CA (US); Manette Gebhardt, Pleasant Hill, CA (US)

(73) Assignee: Henkel IP & Holding GmbH, Duesseldorf (DE)

(*) Notice: Subject to any disclaimer, the term of this patent is extended or adjusted under 35 U.S.C. 154(b) by 1300 days.

(21) Appl. No.: 13/242,740

(22) Filed: Sep. 23, 2011

Related U.S. Application Data

(60) Provisional application No. 61/385,661, filed on Sep. 23, 2010.

(51) Int. Cl.
*B05D 5/10* (2006.01)
*B05D 5/04* (2006.01)

(52) U.S. Cl.
CPC .................................. *B05D 5/04* (2013.01)

(58) Field of Classification Search
CPC ................................. B05D 5/04; B41M 5/52
USPC ............................................... 427/207.1
See application file for complete search history.

(56) References Cited

U.S. PATENT DOCUMENTS

| | | | | |
|---|---|---|---|---|
| 2002/0192462 A1* | 12/2002 | Kondo | .................. | B44C 1/1733 428/343 |
| 2007/0022548 A1* | 2/2007 | Abrams | ................ | D06P 1/0044 8/471 |

* cited by examiner

*Primary Examiner* — Xiao Zhao
(74) *Attorney, Agent, or Firm* — Steven C. Bauman

(57) ABSTRACT

The present invention is directed to a method of preparing a surface to accept paint or coating finish, including the surface of a cured polymer or polymer composite, without the need for additional treatment. The method may be used on flat or curved surfaces, including external and internal surfaces such as those used in the construction of aircraft surfaces.

21 Claims, 3 Drawing Sheets

PEEL AND PAINT TEMPORARY PROTECTIVE COMPOSITION SURFACE COATING

TECHNICAL FIELD

The present invention is directed to a method of preparing a surface to accept paint, including the surface of a cured polymer or polymer composite, without the need for additional treatment. The method may be used on flat or curved surfaces, including external and internal surfaces such as those on parts used in the construction of a range of polymer or polymer composite laminates and articles derived therefrom.

BACKGROUND

Surfaces of polymer or polymer composite parts typically require extensive preparation and cleaning prior to the application of paint. The preparation process usually requires mechanical abrasion of the surface to be painted followed by complete cleaning with solvents in order to achieve adequate paint adhesion. This process is extremely time consuming and expensive and often results in inconsistent bonding surfaces. Additionally, typical composite laminate resin surfaces are susceptible to UV degradation, thus compounding the problems with surface preparation and further resulting in inadequate paint adhesion.

Accordingly, new methods are needed to provide clean, paint-ready composite surfaces.

SUMMARY

The present invention is directed toward methods of preparing composite surfaces for painting, the materials and intermediates used or developed in such processes, and the articles resulting from the use of such methods and intermediates.

One embodiment of this invention is a method for preparing a surface for the application of paint comprising:
  (a) providing a substrate comprising at least one curable substrate polymer composition;
  (b) applying to said substrate a curable surface coating composition comprising a fabric or film with a curable laminating adhesive resin composition;
  (c) exposing the substrate of (a) and the curable surface coating composition of (b) to conditions to permit co-curing thereof and formation of a bond therebetween; and
  (d) removing the fabric or film so as to leave behind a layer of the cured laminating adhesive resin composition on the surface as a site for application of a paint.

Other embodiments of the invention include the various compositions of matter used in or formed by the disclosed methods. For example, another embodiment of the invention includes compositions comprising a curable surface coating composition comprising a fabric or film impregnated or coated with a curable laminating adhesive resin composition.

Other embodiments described by the present invention include those intermediary structures formed during the disclosed methods. For example, such embodiments include those in which the curable surface coating composition has been applied to the curable substrate, those in which the surface coating composition has been co-cured with the substrate, and those in which the cured surface coating composition has been removed from the substrate, and the exposed surface is optionally surface treated, leaving the substrate in a condition for painting.

In yet other embodiments, the invention may include kits for applying the methods described herein, as well as the articles produced by the methods described herein.

Figure 1:
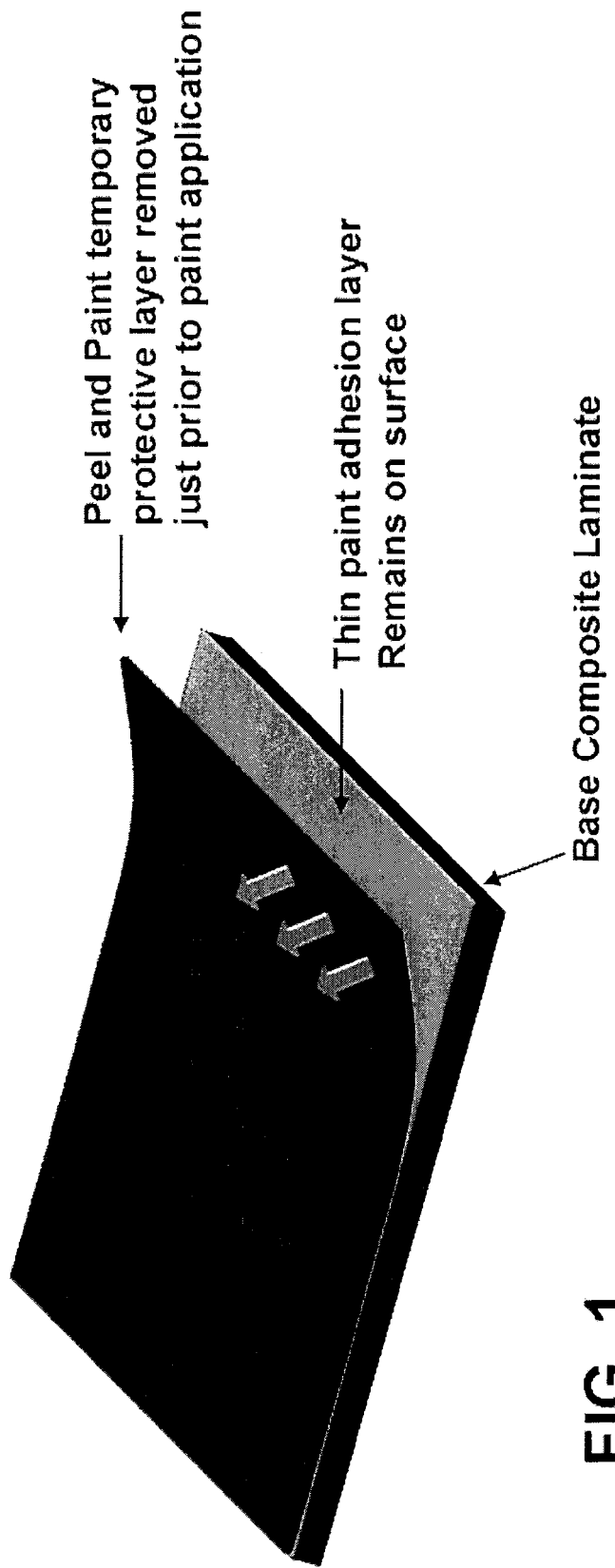
FIG. 1 is a schematic representation of the general method described in this invention.

It is noted here that the Figures are not necessarily drawn to scale, but are presented to reflect specific features generally, and so the scale should not be used to limit the invention described herein.

DETAILED DESCRIPTION OF ILLUSTRATIVE EMBODIMENTS

The present invention is directed to a method of preparing a surface to accept paint or coating finish to said surface, including the surface of a composite following curing, without the need for additional treatment. The method may be used on flat or curved surfaces, including external and internal surfaces such as those used on parts in the construction of air-, land-, and watercraft, as well as other structures and articles.

The present invention may be understood more readily by reference to the following detailed description taken in connection with the accompanying Figures, which form a part of this disclosure. It is to be understood that this invention is not limited to the specific products, methods, conditions or parameters described and/or shown herein, and that the terminology used herein is for the purpose of describing particular embodiments by way of example only and is not intended to be limiting of any claimed invention. Similarly, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer both to the method of preparing articles and to the resulting, corresponding physical articles themselves, as well as the referenced and readily apparent applications for such articles.

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When values are expressed as approximations by use of the antecedent "about," it will be understood that the particular value forms another embodiment. In general, use of the term "about" indicates approximations that can vary depending on the desired properties sought to be obtained by the disclosed subject matter and is to be interpreted in the specific context in which it is used, based on its function, and the person skilled in the art will be able to interpret it as such. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, reference to values stated in ranges includes each and every value within that range.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Finally, while an embodiment may be described as part of a series of steps or part of a more general composition or structure, each said embodiment may also be considered an independent embodiment in itself.

Certain embodiments of this invention provide a method for applying paint to surfaces comprising:
 (a) providing a substrate comprising at least one curable substrate polymer composition;
 (b) applying to said substrate a curable surface coating composition comprising a fabric or film with a curable laminating adhesive resin composition;
 (c) exposing the substrate of (a) and the curable surface coating composition of (b) to conditions to permit co-curing thereof and formation of a bond therebetween; and
 (d) removing the fabric or film so as to leave behind a layer of the cured laminating adhesive resin composition on the surface as a site for application of a paint.

FIG. 1 illustrates a general example of the final step in these embodiments, wherein cured fabric or film of the cured surface coating composition (described as the "temporary protective layer") is removed from the cured base polymer, leaving behind a thin layer of the cured laminating adhesive (described as the "thin paint adhesion layer") ready for the acceptance of paint or coating.

In certain embodiments, the substrates are polymer or polymer composite laminates, where the term "polymer composite laminates" is intended to encompass polymers containing organic or inorganic materials, including continuous or chopped fibers, whiskers, nanomaterials, particulate minerals, ceramic and/or filled or hollow capsules. The curable substrate polymer composition is a curable polymer which may comprise a thermoset or thermoplastic resin. Exemplary, non-limiting curable polymers comprise a benzoxazine, a bismaleimide, an epoxy, a polyamide, a polyester, a polyimide, a polyurethane, a vinyl ester, or a copolymer or mixture thereof. Epoxies are especially suited for the methods described herein.

The curable substrate polymer composition may comprise reinforcing fibers. Such reinforcing fibers may include continuous or chopped fibers or whiskers of alumina, aramid, boron, carbon, glass, silicon carbide, or mixtures thereof. Glass and/or carbon fibers are particularly preferred.

As used herein, the term "fabric" refers to woven or non-woven material. The term "film" connotes a flat polymer section, consistent with its ordinary meaning. Such fabric or film is typically dimensioned so as to at least define the area to be painted. The fabric or film size may vary so as to include sheets, tapes, or continuous rolls. The film may be porous, semi-permeable, or non-porous. Non-porous films are preferred.

Both fabrics and films may include materials comprising a polyester, a polyamide, a polyethylene, a polypropylene, a polyethylenenaphthalate (PEN), a polyethylenterephthalate (PET), a polybutylenterephthalate (PBT), a polyether etherketone (PEEK), a polyamide, a polyaryletherketone (PAEK), a polyethersulfone (PES), a polyethyleneimine (PEI), a poly (p-phenylene sulfide) (PPS), a polyvinyl chloride (PVC), a fluorinated or perfluorinated polymer (such as a polytetrafluoroethylene (PTFE or Teflon®), a polyvinylidene difluoride (PVDF), a polyvinyl fluoride (PVF or Tedlar®)), or a mixture or copolymer thereof. Preferred exemplary fabrics may comprise a polyester, a polyamide, carbon fibers, glass or other inorganic fibers or Kevlar®. Each fabric or film may be coated or impregnated by laminating adhesive resin. The resin may be from 5 to 50% by weight or 10 to 40% by weight of the surface coating composition. Coating or impregnating the films or fabrics may be accomplished by any of the various means well-known to those skilled in the art.

The polymer surface of either the fabrics or films may optionally be coated with silica, siloxane, aluminum oxide, or metal, or treated with plasma or silane.

Polyesters, nylons, or mixtures thereof are especially useful as fabrics or films in this invention.

The surface coating composition that comprises the fabric or film may comprise single-ply or multi-ply fabric constructions. The invention is well-suited for a variety of surface shapes and contours, including flat or essentially flat panels, curved contours, including convex or concave shapes or surfaces comprising combinations thereof. The curable surface coating composition may be applied so as to substantially conform to the contour shape of the substrate.

Typically, this ability to conform to the shape of the substrate is achieved by providing the curable but uncured surface coating composition in a thickness in the range of about 1 to about 20 mils (about 25 to about 500 microns), preferably about 1 to about 10 mils (about 25 to about 250 microns) or about 5 to about 10 mils (about 125 to about 250 microns). Since the curable but uncured surface coating composition comprises a fabric or film impregnated or coated with a resin, the fabric or film itself typically and preferably has a thickness in the range of about 1 to about 10 mils (about 25 to about 250 microns), or about 3 to about 8 mils (about 75 to about 200 microns), or about 5 mils (about 125 microns).

Where the fabric is woven, the woven fabric comprises tightly woven mono- or multi-filament tows. Tightly woven, high density weaves are preferred so as to provide a smooth finish, compatible with the finish desired for the final painted product. Accordingly, preferred weaves include a plain weave, a harness satin weave, a crow-foot satin weave, or a twill, with a crow-foot satin weave style being most preferred. Polymer films may be envisioned as the ultimate closed weave and calendared fabric, with polymer films providing a surface roughness which can be significantly less than even highly calendared, closed weave fabrics.

Figure 2:
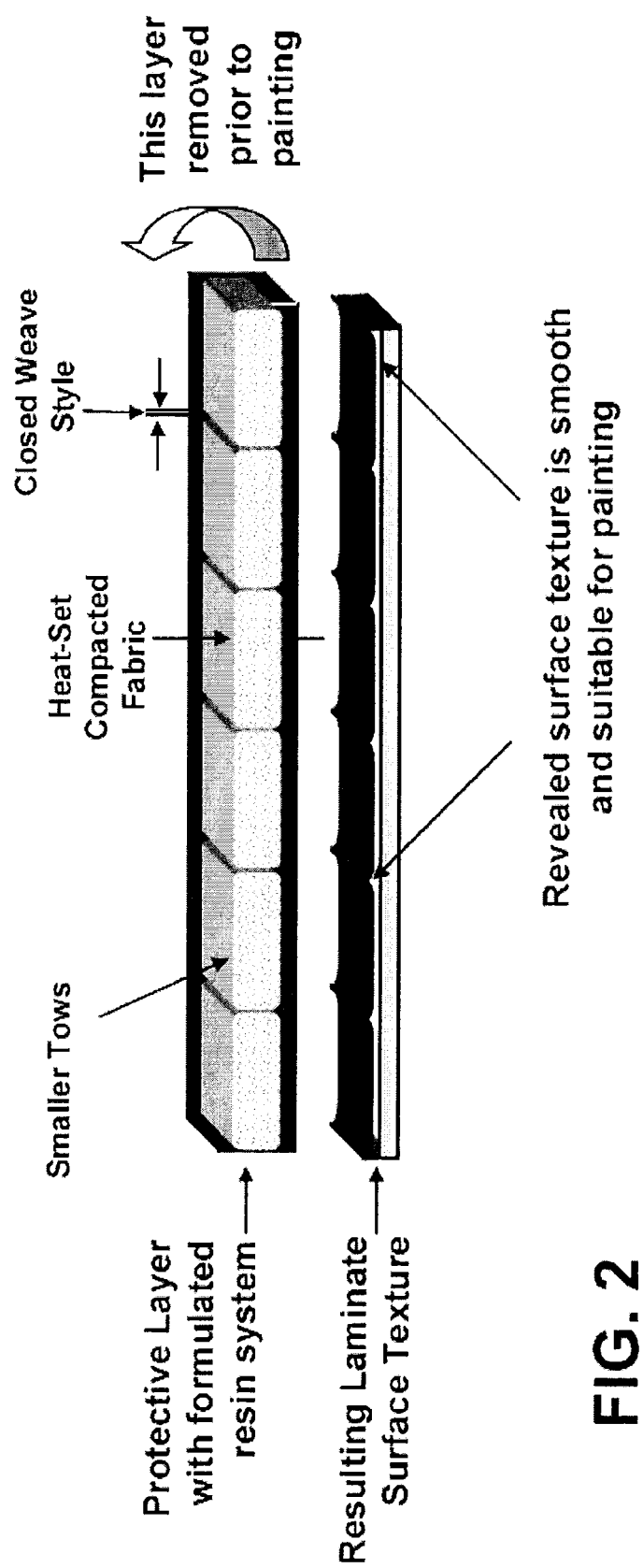
FIG. 2 is a schematic representation of the method as applied to an embodiment wherein the curable surface coating composition comprises a fabric.
Figure 3:
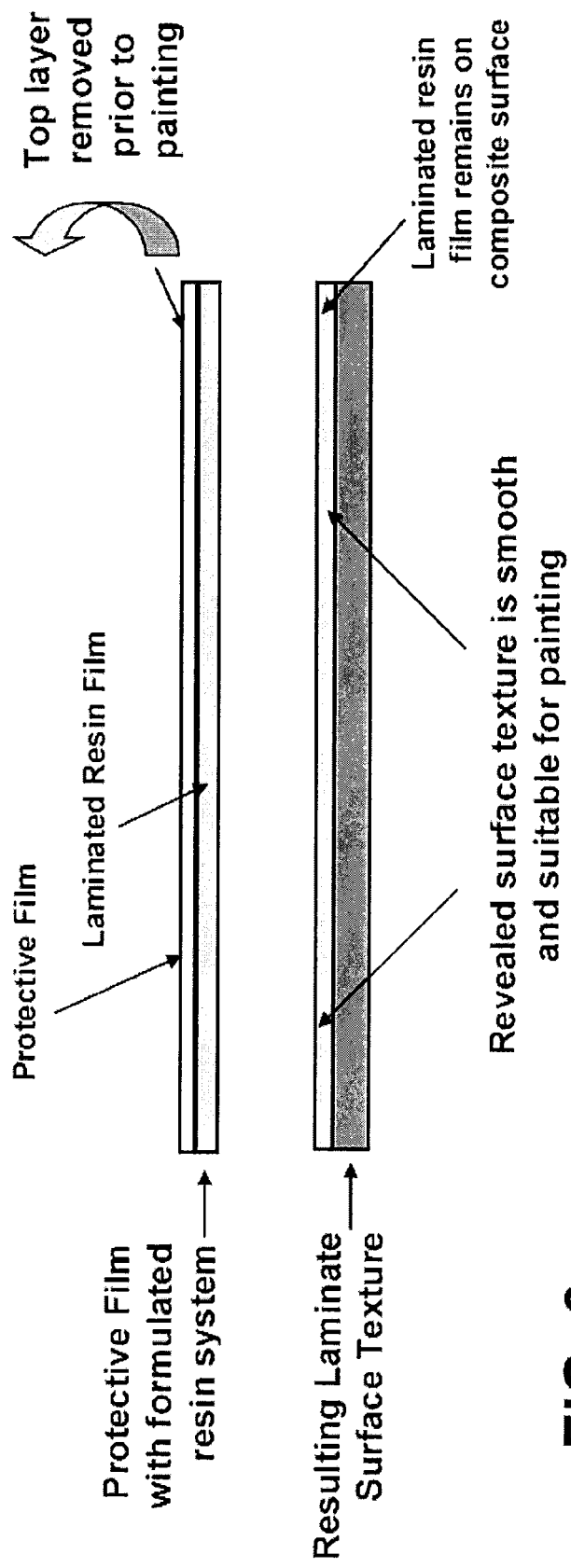
FIG. 3 is a schematic representation of the method as applied to an embodiment wherein the curable surface coating composition comprises a film.

FIGS. 2 and 3 show embodiments wherein the cured surface coating compositions comprise a fabric impregnated with the curable/cured laminating adhesive resin composition and a film coated on one side with said laminating adhesive resin composition, respectively. While the texture of the revealed surface in FIG. 2 is exaggerated for effect, it does reflect the differences in smoothness achievable by the film and fabric options.

The tightness of the weave can be described in terms of warp ends and fill ends per inch, both terms being readily understood by those skilled in the art of woven fabrics. Fabrics or films of this invention comprise those which independently contain at least 80 warp ends per inch, or at least 100, 120, 140, or 160 warp ends per inch, and at least 40 fill ends per inch, or at least 60, 80, or 100 fill ends per inch. For example, good results are obtained wherein the fabrics or films contain at least about 80 warp ends per inch and at least about 40 fill ends per inch. More preferred embodiments include those weaves wherein the fabric is woven with at least 120 warp ends per inch and at least 60 fill ends per inch. Such weaves are commercially available, for example, from Precision Fabrics Group of Greensboro, N.C., and those characterized as providing "fine surface impressions" are most preferred. Exemplary compositions include 60004/56111 polyester, 51789/52006 nylon, and 52008/56115 nylon materials. Fiber or yarn thicknesses are such as to provide minimally open weaves, given the warp end/fill end parameters, and consistent with the thickness of the overall fabric.

The final surface finish of the article can be further improved using fabrics which have been scoured, heat set, and calendared so as to create a smooth tightly woven surface, with limited openings to reduce penetration of the laminating resin (e.g., see FIG. 2). This calendaring can be done before the application of the laminating resin, or as part of the process to impregnate the fabrics with said resin.

The laminating adhesive resin composition is preferably chemically compatible with the curable substrate polymer composition. The laminating adhesive resin may comprise a resin of the same or different chemical type of the curable substrate polymer composition. In this regard, various exemplary embodiments include epoxy or substrate resin or mixtures thereof. Epoxies are especially preferred. Applicants have seen good results with Hysol® EA 9895 resin.

In certain embodiments, the flow characteristics of the laminating adhesive resins are such that the adhesive resin does not appreciably migrate into the curable substrate polymer composition prior to co-curing but that, once co-cured, forms an excellent bond with the substrate. In some embodiments, this degree of penetration is less than 50 microns, less than 10 microns, less than 5 microns, or less than 1 micron.

The nature of the bond between the co-cured substrate polymer and the laminating adhesive depends on several factors, including processing conditions and the nature of the individual components, ranging from largely or entirely physical to largely or entirely chemical. The skilled artisan will appreciate those materials and processing conditions necessary to achieve the desired bonding between the substrate polymer and the laminating adhesive.

Another characteristic of the surface coating composition is that the fabric or film release easily from the cured laminating adhesive resin, such that the tensile strength of the fabric or film is greater than that of the cured adhesive, so that, for example, the fabric or film does not shred during the subsequent removal.

Once the curable substrate polymer composition is contacted with the curable surface coating composition, the combination may be exposed to conditions favorable to permit co-curing thereof and formation of a chemical bond therebetween. Such conditions depend on the specific materials chosen and the skilled artisan will be able to determine the best conditions for forming such a bonded interface. Exemplary processes which can be used to co-cure the materials include thermal or radiative curing, such as typically employed for the materials discussed.

Once co-cured, the cured surface coating composition has a total thickness in the range of 1 to 10 mils (about 25 to about 250 microns), preferably in the range of about 1 to about 5 mils (about 25 to about 125 microns), and most preferably about 3 mils (about 75 microns).

The actual bond strength between the cured layers (e.g. cured substrate polymer composition and cured surface coating composition) depends on the surface condition of the original surface coating composition, the degree of curing, and the nature of the curable materials employed, and it is well within the abilities of the skilled artisan to optimize the conditions to provide for acceptable bond strength.

One advantage of the present invention is that the co-cured surface coating composition can stay on the substrate throughout manufacture and assembly to protect said part from contaminants and exposures to UV sources, until the part is ready for painting or other surface coating. In this regard, the thicker or more chemically or physically robust sacrificial layer (i.e., the amount of material removed when the surface coating composition is removed) is preferred so as to be able to more completely protect the substrate part during processing Once co-cured, the surface coating composition, or at least a portion thereof, is removed. Typically, this removal is done by a peeling action so as to leave behind a layer of the cured laminating adhesive resin composition on the surface as a site for application of paint. This peeling process typically removes between about 50 and about 90% by weight, between about 60 and about 80% by weight, or about 70% by weight of the uppermost layers of the cured surface coating composition, including essentially all of the fabric or film, leaving behind up to about 10, 20, 30, 40, or 50 microns of the cured laminating adhesive resin composition to expose a surface capable of accepting paint without additional surface conditioning or treatment. For example, it is preferred that the smoothness of the final exposed surface be such that the leveling characteristics of the paint or coating provides an industry- or use-acceptable final finish. Achieving a surface compatible for painting without further treatment depends on the smoothness of the weave or surface of the fabric or film. It is also important that the film and especially the fabric exhibit sufficient structural integrity such that when it is removed from the cured lamination adhesive resin composition, it can be removed without leaving behind individual filament strands. It is preferred that the surface is essentially free of individual filament strands of the fabric or film.

The invention also contemplates embodiments comprising the additional step of applying such paint or other filled or unfilled or clear coat finish, and the articles derived therefrom. In part by judicious choice of type and style of fabric, the surface may be painted without additional surface conditioning or treatment, such that the exposed surface meets the customer or industry requirements for the finish required for any particular intended final end-use application. However, the invention is not limited so as to preclude such surface treatment, and methods including surface grinding with sand paper, pin hole filling, plasma, laser treatment, mechanical abrasion, priming, or etching (chemical or physical) may be employed.

The methods for applying the paints are not limited to any particular means, though spray painting is typically used to allow for smooth coverage over large areas. Similarly, the choice of paint is not limiting, so long as the paint is compatible with the final surface composition. Preferred paints are those comprising a polyacrylate, a polyester, a polymethacrylate, a polyurethane, or a co-polymer or mixture thereof. The bonding of the paint to the exposed surface can be physical or chemical, or both, depending on the nature of the paint chosen. It is expected that the exposed surface will have a higher concentration of reactive chemical groups attached to the surface, resulting from the peeling process, than it would otherwise have had in the absence of the process described herein. As a result, it is also expected that the resulting bonding between the exposed surface and the paint will more likely to have a higher contribution of chemical interaction with the paint than it would have had without the process, thereby providing for a more integral bond.

Similarly, while the general discussion herein describes those situations wherein the adhesive forces of the bond between the cured substrate and the cured surface coating composition exceed those of the cohesive forces of the cured surface coating composition, it is also contemplated within this invention that other related scenarios may exist. That is, in additional embodiments, on removing the cured surface coating composition, separation may occur at the interface between the cured substrate and the cured surface coating composition or within the uppermost layers of the cured substrate. In each of these situations, one or more of the top molecular layers of the substrate may be removed, thereby exposing clean surfaces of the cured substrate. These clean surfaces may be chemically more reactive than would otherwise have existed in the absence of the co-curing and removal of the curable surface coating composition. In these situations as well, an object of the invention is accomplished—i.e., providing a surface ready to accept paint with minimal or no additional surface preparation.

To this point, the various embodiments have been described in terms of the methods for preparing a surface and applying paint, though it is also to be appreciated that the various compositions of matter used in these methods also fall within the scope of this invention. In particular, the various embodiments described above as referring to the curable surface coating compositions all fall within the scope of this invention as separate embodiments for compositions of matter.

These embodiments include those descriptions related to the impregnated or coated fabric or films, including but not limited to those descriptions related to the weave, dimensions, compositions, and structural integrities of the materials, as well as the nature and properties of the curable and cured laminating adhesives. Other embodiments also include those kits, packages or containers containing the necessary components to enable the processes described, said kits, packages or containers optionally providing written instructions as to how to process these materials.

Other embodiments described by the present invention include those intermediary structures formed during the methods previously presented. In particular, the invention is intended to include those embodiments of articles or compositions in which the curable surface coating composition has been applied to the curable substrate and optionally conforms thereto, those in which the surface coating composition has been co-cured with the substrate forming a bond there between, and those in which the cured surface coating composition has been removed from the substrate and the exposed surface optionally surface treated, leaving the substrate in a condition for painting.

Again, these compositions of matter embodiments are defined by those descriptions provided above, including but not limited to the thickness and quality of the curable and cured surface coating compositions, and the nature of the final pre-painted products or articles.

Various embodiments of this invention also include those articles produced by the methods described herein. The invention is suited for structures of any size, but is especially attractive in its ability to accommodate large structures. It is envisioned that such objects produced using the methods described herein are contained within the scope of this present invention. Structures contemplated include those which may be one of more of any of a primary structure element, secondary structure element, exterior element, interior element and parts forming those elements in commercial and personal aircraft and aerospace applications, motor vehicles, watercraft (including ships), railroad cars and tankers and storage tanks. It may also be used to prepare smaller articles, including, but not limited to, sports equipment (e.g., fishing rods, bicycle frames).

As those skilled in the art will appreciate, numerous modifications and variations of the present invention are possible in light of these teachings, and all such are contemplated hereby. For example, in addition to the embodiments described herein, the present invention contemplates and claims those inventions resulting from the combination of features of the invention cited herein and those of the cited prior art references which complement the features of the present invention. Similarly, it will be appreciated that any described material, feature, or article may be used in combination with any other material, feature, or article.

The disclosures of each patent, patent application, and publication cited or described in this document are hereby incorporated herein by reference, in their entirety.

What is claimed:

1. A method for preparing a surface for the application of paint comprising:
    (a) providing a substrate comprising at least one curable substrate polymer composition;
    (b) applying to said substrate a curable surface coating composition comprising a fabric or film with a curable laminating adhesive resin composition;
    (c) exposing the substrate of (a) and the curable surface coating composition of (b) to thermal or radiative conditions sufficient to permit co-curing thereof and formation of a bond therebetween; and
    (d) removing the fabric or film so as to leave behind a layer of the cured laminating adhesive resin composition on the surface as a site for application of a paint.

2. The method of claim 1 wherein the substrate is a laminate.

3. The method of claim 1 wherein the curable substrate polymer composition comprises an epoxy.

4. The method of claim 1 wherein the curable substrate polymer composition further comprises reinforcing fibers.

5. The method of claim 1 wherein the fabric or film comprises a fluorinated or perfluorinated polymer, a polyester, a polyamide, a polyethylene, a polypropylene, a polyethylenenaphthalate, a polyethylenterephthalate, a polybutylenterephthalate, a polyether etherketone, a polyaryletherketone, a polyethersulfone, a polyethylenenimine, a poly (p-phenylene sulfide), a polyacrylate, a polymethacrylate, a polyvinyl chloride, or a co-polymer or mixture thereof.

6. The method of claim 5 wherein the fabric or film comprises a polyester, a nylon, a fluorinated or perfluorinated polymer, or a mixture thereof.

7. The method of claim 1 wherein the curable surface coating composition has a thickness in the range of 1 to 10 mils.

8. The method of claim 1 wherein the curable surface coating composition substantially conforms to the contour shape of the substrate.

9. The method of claim 1 wherein the fabric or film has a thickness in the range of 1 to 5 mils.

10. The method of claim 1 wherein the fabric is a woven fabric.

11. The method of claim 10 wherein the woven fabric comprises woven multifilament tows.

12. The method of claim 10 wherein the woven fabric comprises a plain weave, a harness satin weave, a crow-foot satin weave, or a twill.

13. The method of claim 12 wherein the fabric is woven in a crow-foot satin weave style.

14. The method of claim 10 wherein the fabric is woven with at least 80 warp ends per inch and at least 40 fill ends per inch.

15. The method of claim 14 wherein the fabric is woven with at least 120 warp ends per inch and at least 60 fill ends per inch.

16. The method of claim 10 wherein the fabric is scoured, heat set, and calendared to create a smooth tightly woven surface.

17. The method of claim 1 wherein the laminating adhesive resin composition comprises a curable epoxy resin.

18. The method of claim 1 wherein the cured surface coating composition has a total thickness in the range of 1 to 5 mils.

19. The method of claim 1 wherein the fabric or film is removed from the cured laminating adhesive without leaving behind individual filament strands.

20. The method of claim 1 further comprising applying paint.

21. The method of claim 1 wherein the surface is painted without additional surface conditioning or treatment.

* * * * *